United States Patent [19]

Shevokas et al.

[11] 4,403,778
[45] Sep. 13, 1983

[54] FACE SEAL ASSEMBLY AND METHOD OF USE

[75] Inventors: Edward J. Shevokas; William S. Bathgate, both of Ames, Iowa

[73] Assignee: Sundstrand Corporation, Rockford, Ill.

[21] Appl. No.: 382,492

[22] Filed: May 27, 1982

[51] Int. Cl.³ .............................................. B23P 19/02
[52] U.S. Cl. .......................................... 277/1; 277/9.5
[58] Field of Search ......................... 277/1, 9.5, 81 R; 29/235

[56] References Cited

U.S. PATENT DOCUMENTS 3,947,944  4/1976  Washington ............................ 277/1

FOREIGN PATENT DOCUMENTS 634848  3/1950  United Kingdom ................ 277/9.5

Primary Examiner—Robert I. Smith
Attorney, Agent, or Firm—Ted E. Killingsworth; Michael B. McMurry; Harold A. Williamson

[57]                ABSTRACT

The present invention is directed to a simplified one-piece sleeve used in a face seal assembly to maintain elements of the face seal in abutting relationship from the time of assembly in a clean room environment until final positioning of the seal elements within a shaft housing environment to insure both cleanliness and concentricity of the face seal elements.

20 Claims, 7 Drawing Figures

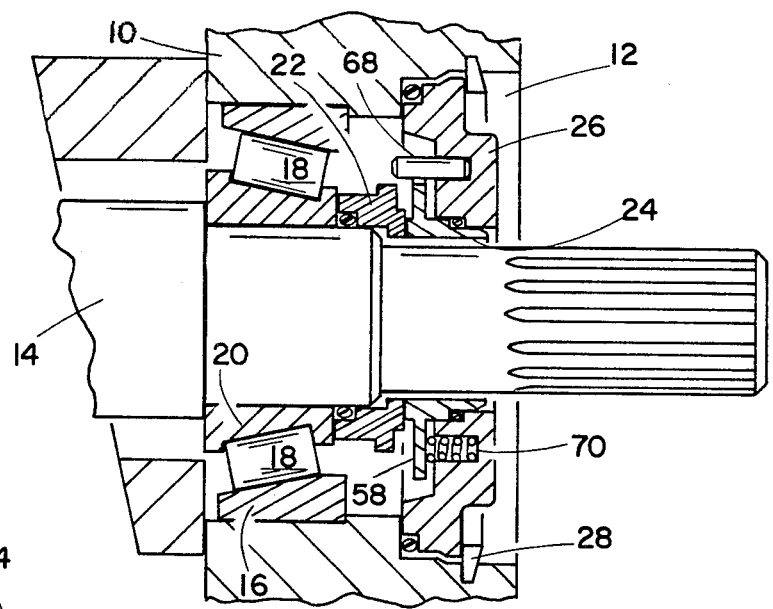
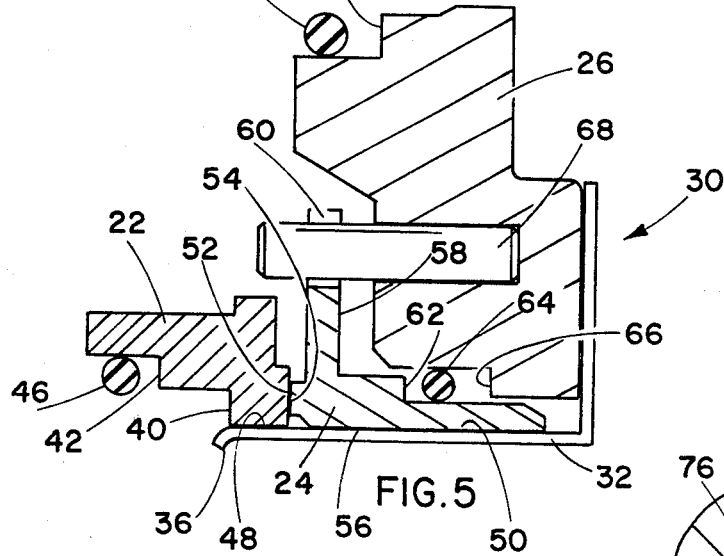
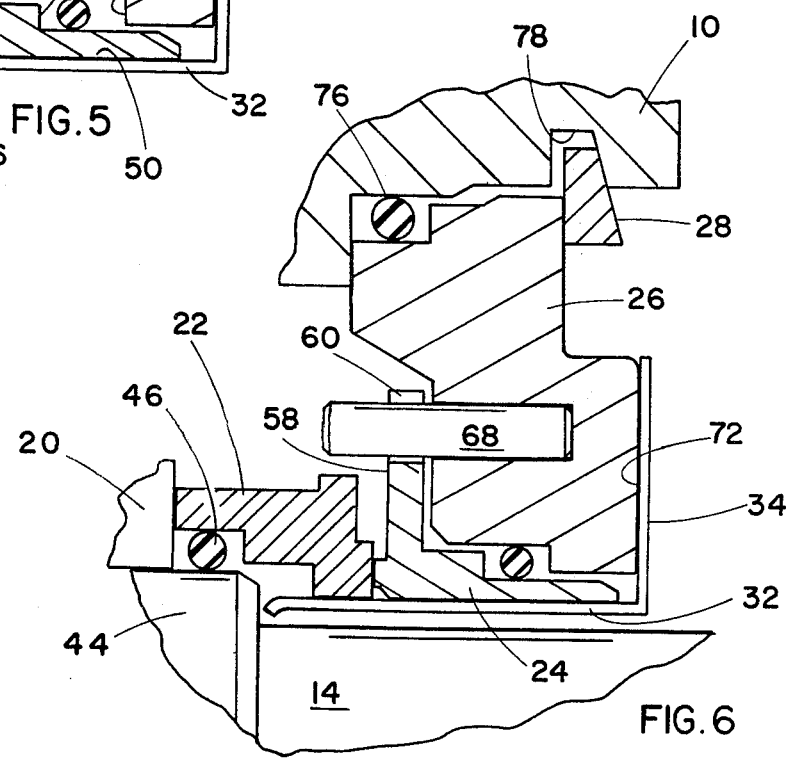

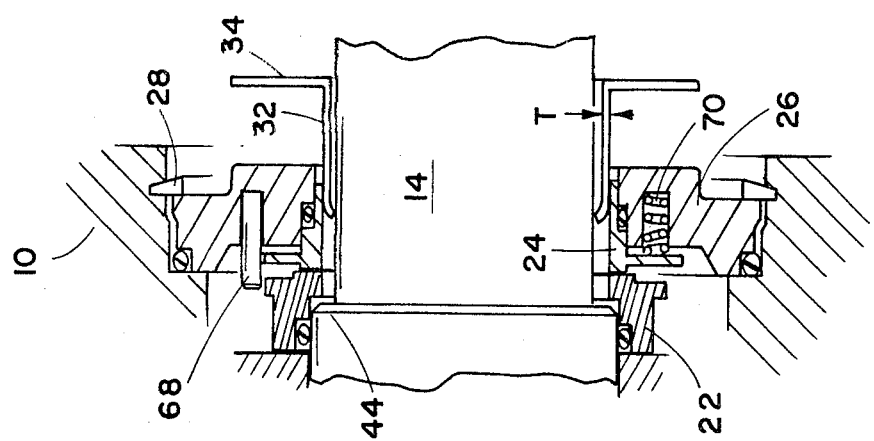
FIG 4
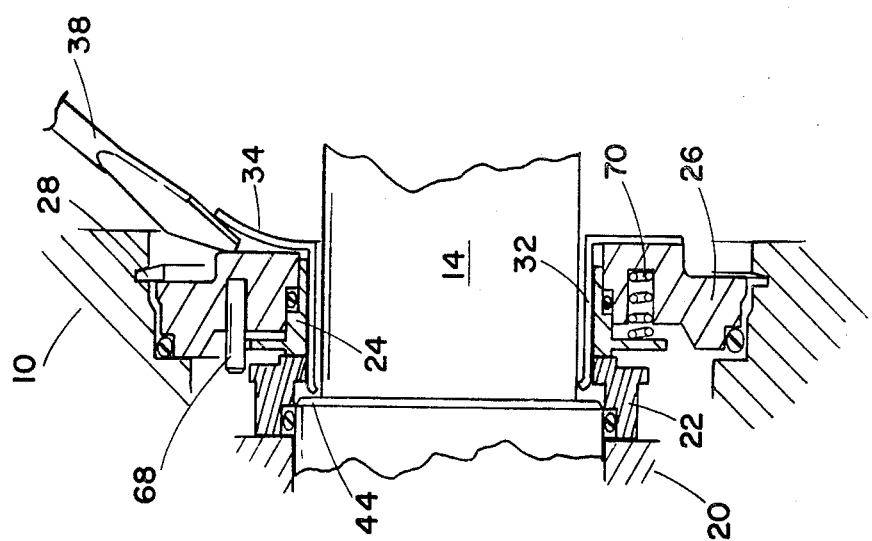
FIG 3
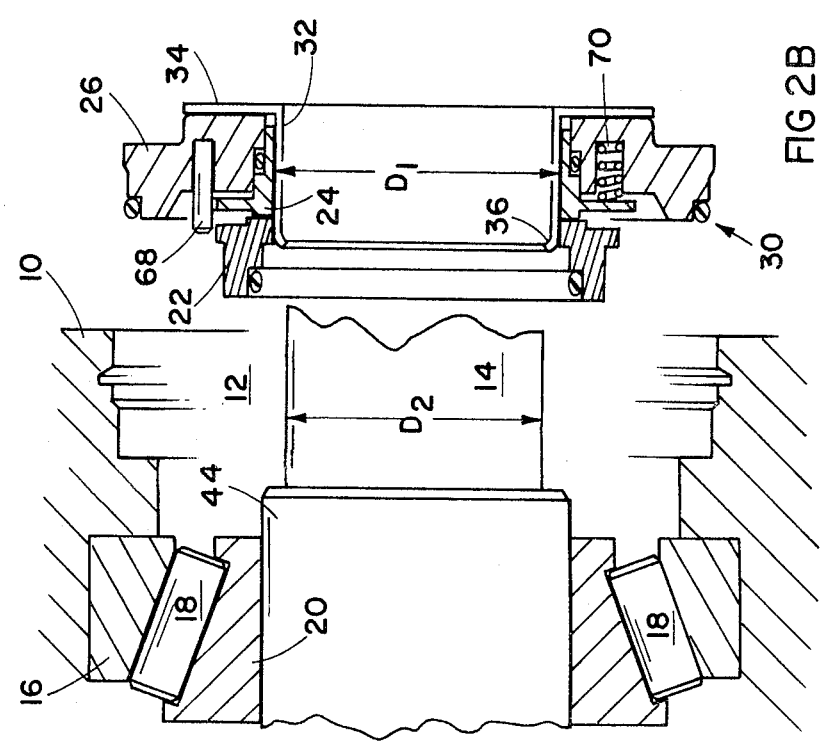
FIG 2B
FIG 2A

FACE SEAL ASSEMBLY AND METHOD OF USE

FIELD OF THE INVENTION

The present invention is directed to a face seal assembly and its method of use for maintaining face seal elements in an abutting relationship on a sleeve during both the transporting and positioning of the face seal elements within a shaft housing environment. By maintaining the face seal elements on the sleeve from the time of original assembly until the final positioning and securing of the face seal elements within the face seal environment insures both the cleanliness and concentricity of the face seal elements.

BACKGROUND OF THE INVENTION

Rotary face seal failure caused by contamination of high precision sealing faces has long been a problem. Microscopic particles introduced prior to and during assembly into a shaft housing environment during either original production or in field service often results in face seal failures. Environmental conditions often permit dust, dirt, metal particles, etc. to adhere to the sealing faces prior to the final assembly and such contamination prevents full face area contact which allows a fluid leak path to form resulting in seal failure. Furthermore such particles may also become embedded causing surface scratches or scoring resulting in seal failure. Such possibility of contamination is even more of a problem in field service where a seal assembly must be replaced under extremely dirty conditions. This problem is increased by field service or repair of off-road equipment which is normally serviced in situ due to the expense of down time and because movement of a machine with leaky seals can cause contamination damage to other parts such as bearings.

Quite often the face seal elements are precision machined, in the example of the preferred embodiment of the present possession, to 0.000020 inch TIR and then cleaned and packaged in a clean room environment. Such efforts however are negated if the individual elements of the face seal and their retainer are individually assembled on a machine shaft in an assembly line environment or in a field service environment, neither of which begin to approach the contamination free environment of the clean room. This often results in the dust, dirt and even fingerprints contaminating the seal interface.

One apparatus and method of use utilized to reduce such face seal contamination is taught in U.S. Pat. Washington No. 3,947,944 issued Apr. 6, 1976 and Washington No. 4,026,005 issued May 31, 1977. The apparatus and method taught utilize a two-piece transfer fixture wherein the seal components are installed on such fixture in their appropriate working relationship with the seal faces maintained in an abutting relationship on a transfer fixture to prevent contamination of the face seal interface. Such abutment may be established in a clean room environment and maintained during subsequent handling until the face seal elements are positioned near their final assembly position. However, the two-piece transfer tool of these patents requires that the seal elements be removed from the transfer fixture and axially moved into their final assembly position. This last operation is without the aid of the transfer tool pilot which maintains concentricity and cleanliness. Due to manufacturing tolerances, there is no guarantee that the transfer tool pilot and the shaft are of equal diameter and thus it is possible that the desired special relationship between the elements of the face seal is not maintained during the last critical stage of the transfer operation unless each transfer tool pilot is machined to match the specific shaft diameter. Not only does this prior art structure not maintain the shaft seal assembly in its previous assembled form throughout the total transfer operation, but the shaft must be of a special shape to permit the transfer tool to be axially located near the final assembled position. An elongated constant diameter shaft would require an extreme stroke of the transfer tool thus limiting the practicality of the two-piece device.

SUMMARY OF THE INVENTION

The present invention is directed to a face seal assembly and method for transporting and positioning the face seal assembly within its final assembled position within a shaft housing environment while maintaining the element of the face seal in an abutting relationship throughout the total assembly operation to assure both concentricity and cleanliness of the face seal interface.

It is a further object of the present invention to provide a simple inexpensive single piece transfer tool which can be utilized in the original positioning and alignment of face seal elements and also utilized in their transport and final positioning within a shaft housing environment.

It is a further object of the present invention to assemble, transport, and finally position a face seal assembly having an axial spring loading feature wherein the face seal assembly is placed in its final position relative to a shaft housing environment and secured in place with spring loading being applied to the seal interface while the face seal assembly is still positioned on the transfer tool.

It is still another object of the present invention to provide a face seal assembly transport feature utilizing a fixture of such simple design and low cost that it is readily disposable to justify its use in field service repair.

It is also an object of the present invention to provide a face seal assembly for transporting face seal elements while maintaining the face seal elements in a mutually abutting relationship, the face seal elements including a first element having a sealing face and a second seal element having a sealing face adapted to abut the first element sealing face to form a rotating seal interface and the face seal assembly includes a sleeve having the first and second elements axially positioned thereon with the sealing face in abutting contact and with each of the elements frictionally engaging the outer surface of the sleeve to prevent relative axial movement of the elements, and whereby the face seal assembly is adapted to be positioned within a housing in a final assembly position concentric with respect to a shaft with the first and second element sealing faces in an axially abutting relationship on the sleeve.

It is a further object of the present invention to provide a method of maintaining a face seal assembly in abutting relationship and positioning the assembly within a housing having a shaft rotatingly supported therein, the face seal assembly includes a first seal element adapted to engage the shaft and rotating therewith, a second seal element adapted to be stationarily secured within the housing, the first and second seal elements having first and second faces respectively which are adapted to abut each other and form a rotating seal interface, the method characterized by: forming a face seal assembly by positioning the first and second seal elements on a sleeve with the first and second faces mutually abutting and with the first and second seal elements frictionally engaging the outer surface of the sleeve to maintain the first and second faces in abutting relationship, concentrically positioning the face seal assembly around the shaft in a manner wherein a portion of the first seal element cooperates with the shaft in a manner to impart the rotation of the shaft to the first seal element, securing the second seal element to the housing in a manner which prevents rotational movement of the second seal element relative to the housing, and then axially removing the sleeve from between the shaft and the first and second seal elements.

BRIEF DESCRIPTION OF THE DRAWINGS

FIG. 1 is a sectional view with the face seal elements of the present invention in their final assembled position.

FIG. 2a is a sectional view of the shaft housing environment.

FIG. 2b is a sectional view of the face seal assembly of the present invention prior to insertion into the environment of FIG. 2a.

FIG. 3 is a partial sectional view showing the face seal assembly within its environment with the upper portion of this figure showing the assembly being secured to the housing.

FIG. 4 is a partial sectional view showing the face seal elements secured and the sleeve of the present invention partially removed.

FIG. 5 is an enlarged partial sectional view showing the face seal assembly.

FIG. 6 is an enlarged partial sectional view showing the face seal assembly located within the shaft housing environment.

BRIEF DESCRIPTION OF THE PREFERRED EMBODIMENT

The face seal assembly of the present invention is designed for use in a shaft housing environment such as represented in FIG. 1 as the shaft end of a fixed displacement axial piston motor. The motor includes a housing 10 partially shown in FIG. 1 having an end opening 12 to accommodate the motor shaft 14. Supporting the shaft 14 for rotation with respect to the housing 10 is a roller bearing have an outer race 16, rollers 18 and an inner race 20. In order to prevent dirt and other contamination from passing through the opening 12 and thus reaching the roller bearing and other critical parts of the motor assembly, a face seal is provided. The face seal may also be utilized to retain fluid within the housing 10. The particular face seal includes a first annular seal element 22 adapted to rotate with the shaft 14, a second annular seal element 24 which axially abuts with the first seal element to form a seal interface and a seal retainer 26 which axially positions the second seal element and prevents rotation of the second seal element relative to the housing. The retainer 26 is secured to the housing 10 by means of a circular clip 28.

FIG. 2a is enlarged over FIG. 1 and shows the shaft housing environment prior to the positioning of the face seal elements. FIG. 2b shows the face seal assembly 30 of the present invention which in the preferred form consists of the face seal elements 22 and 24 and retainer 26 axially positioned on a thin sleeve 32. The sleeve 32 is formed with an end flange 34 and may be rigid, but preferrably is molded as a unitary piece from plastic material such as ABS and having an approximate thickness T (see FIG. 4) of 0.025 inch. By making the sleeve 32 relatively thin and of a plastic material, the sleeve may be yieldable or slightly deformable to enhance the frictional cooperation between the sleeve 32 and the face seal elements 22 and 24. This face seal assembly 30 is preassembled in a clean environment generally referred to as a clean room by sliding the retainer 26 over sleeve 32 until it abuts sleeve flange 34. The second face seal element 24 is then axially positioned on the sleeve in a cooperating relationship (to be described later) with the retainer 26. Finally the first face seal element is axially positioned on the sleeve 32 in an abutting relationship with the second face seal element 24. In order to facilitate the sliding of the first and second face seal elements onto the sleeve 32, the sleeve 32 may be provided with a small annular inwardly extending lip 36 which acts as a pilot in the preassembly operation.

As stated above, the seal interface between elements 22 and 24 is quite critical and these two elements particularly at the interface are finally machined and cleansed prior to forming the face seal assembly 30. Since the face seal assembly 30 is preassembled in the clean room with the two seal elements put in abutting relationship and maintained in such abutting relationship upon the sleeve 32, this reduces or eliminates the possibility of dirt and contamination reaching the interface between the two seal elements 22 and 24. It is noted that both seal elements preferably have the same minimum internal diameter $D_1$ so that they can both be concentrically positioned on a cylindrical sleeve having an external diameter that is equal to or slightly greater than $D_1$. This furthermore assures that the two seal elements once axially positioned are frictionally retained in place on the sleeve 32 which assures that the abutting relationship of the seal interface is maintained from preassembly, through transport, and until the face seal assembly 30 is finally positioned within the shaft housing environment of FIG. 2a. It is also contemplated that seal element 24 could have a greater minimum internal diameter than $D_1$, but this would require that sleeve 32 include a step which increases complexity and might reduce the accuracy of the concentric relationship between elements 22 and 24.

In order to allow for the positioning of the shaft seal assembly, including the sleeve 32 within the shaft housing environment, the shaft is provided with a diameter $D_2$ which is less than the internal diameter of the sleeve 32. For a thickness T of the sleeve 32, it is noted that the relationship between the diameters $D_1$ and $D_2$ meets the equation 2T is less than $D_1$ minus $D_2$. Theoretically 2T could be equal to $D_1$ minus $D_2$ except that this would hinder the insertion of the assembly 30 onto shaft 14 and the removal of the sleeve after the final assembly operation. It is noted that the shaft 14 from its outer free end to that portion of the shaft which is adapted to receive the shaft seal assembly in its final position need not be of any particular configuration as long as the diameter $D_2$ does not become greater than $D_1$ minus 2T. Therefore no specific shaft configuration is necessary to allow for the final positioning of the face seal assembly 30 with the seal elements 22 and 24 still being maintained in abutting relationship on sleeve 32.

FIG. 3 shows the face seal assembly 30 positioned about the shaft 14 in the final assembly position with the first face seal element 22 abutting the bearing inner race 20. With the face seal assembly 30 in its final assembly position it is noted that the face seal elements are still concentrically and abuttingly maintained on the sleeve 32. As shown in the upper portion of FIG. 3, the circular clip 28 having a wedge shaped cross section is now inserted securing the seal retainer 26 against rotation with respect to the housing 10. At this time a tool such as screwdriver 38 may be inserted between the flange 34 of the sleeve 32 and the retainer 26 so as to deflect the flange outwardly to permit the gripping thereof either by a tool such as a pair of pliers or by manual finger gripping so that sleeve 32 may be removed. Partial removal of the sleeve 32 is shown in FIG. 4 leaving the sealing elements of the face seal assembly in their final secured position relative to the shaft housing environment and with the sealing faces abutting and in concentric relationship.

Reference is now made to FIGS. 5 and 6 which show an enlarged partial cross-section of the face seal assembly 30 and the relationship of the face seal assembly relative to the shaft housing environment. These enlarged partial sectional views more clearly show the details of the relationship of the parts of the face seal assembly 30 and their intercooperation. As a matter of convenience, each of the elements of the face seal assembly is referred to as having an inner end facing the interior of the housing and an outer end facing the exterior of the housing. The inner end of the first face seal element 22 is provided with two internal steps 40 and 42. The step 40 is provided to allow clearance for an enlarged exterior step 44 of the shaft 14. The second step 42 of the first seal element 22 allows provision for an O-ring seal 46. The first face seal element 22 does not axially engage the shaft 14 but cooperates with the shaft through the O-ring 46 which is compressed to provide frictional engagement with the step 44 of the shaft and the internal step 42 of the first face seal element 22. The first face seal element is also provided toward its outer end with an internal cylindrical surface 48 which as mentioned above is of the dimension $D_1$ and adapted to frictionally engage the external surface 50 of the sleeve 32. It is noted that the inner portion of the first seal element 22 having the steps 40 and 42 is axially positioned away from the sleeve lip 36 so that the step portion of the first seal element 22 may engage the shaft 14 while the internal surface 48 is still in frictional engagement with the sleeve 32 as best seen in FIG. 6. The outer end of the first face seal element 22 is provided with a radially extending annular face 52 which forms the first portion of the seal interface.

The second face seal element 24 on its inner end is provided with a second radially extending annular face 54 which provides the other portion of the seal interface. This seal element is also provided with an internal cylindrical surface 56 which frictionally cooperates with the external surface 50 of the sleeve 32. It is the frictional engagement of the two internal surfaces 48 and 56 that maintains the abutting relationship of the face seal interface surfaces 52 and 54 once the seal elements are axially positioned on the sleeve 32. The second seal element 24 is furthermore provided with a circular radially extending flange 58 having a notch 60 located on the periphery thereof. Located on the outer surface and adjacent the outer end of the second seal member 24 is a step 62 which locates an O-ring seal 64.

The seal retainer 26 is located outward and surrounding the second seal member 24 and it is also provided with a step 66 to receive the O-ring 64. It is noted that that two steps 62 and 66 are axially spaced so that there can be limited axial movement between the second seal element 24 and the retainer 26. The inner end of the retainer 26 is provided with a pin 68 which cooperates with a notch 60 on the second seal element flange 58 so as to prevent relative rotational movement between second seal element 24 and the retainer 26. Furthermore the retainer 26 retains coil springs 70 (shown in FIGS. 1-4) which are axially oriented so as to provide a biasing force on the second seal element 24 through flange 58. Preferably there are eight coil springs 70 which are equally arcuately spaced so as to provide even pressure on the circular flange 58. The outer end of the retainer 26 has a radially extending surface 72 which in the assembled position of the face seal assembly abuts the flange 34 of the sleeve 32. The outer periphery of the retainer is provided with a step 74 which receives a third O-ring seal 76. This latter O-ring cooperates with the retainer 26 and the housing 10 to form a stationary seal.

The faces 52 and 54 of the face seal elements are precision machined and then the face seal elements 22 and 24 along with the retainer 26 are thoroughly cleansed in a clean room environment. They are then axially positioned on the sleeve 32 as explained above and packaged so as to maintain their clean condition. While the faces 52 and 54 are maintained in their abutting relationship due to the frictional engagement of the elements 22 and 24 with the outer surface 50 of the sleeve, the likelihood of contamination reaching the faces 52 and 54 is greatly reduced. The assembly 30 as packaged is then transported to either the production floor or as a service part to a field service environment.

The assembly 30 is then removed from the package and as a unit is slipped over the shaft 14 until it reaches its final assembly position shown on the bottom portion of FIG. 3. At that time, axial pressure is applied to the outer end of retainer 26 causing the coil springs 70 to apply an evenly distributed force on the flange 58 of the second face seal element 24 so as to bias the second seal element 24 against the first seal element 22 whose axial movement is limited by its abutment against the inner race 20 of the bearing. As can be seen in FIGS. 5 and 6, the axial spacing between the second seal element 24 and the retainer 26 is reduced from the relatively large spacing of FIG. 5 to the small spacing of FIG. 6 as the coil springs 70 are compressed. It is now that the circular clip 28 is inserted into a tapered notch 78 of the housing 10 to securely lock the retainer 26 in its final axial position. In this position, the coil springs 70 are compressed and the pin 68 prevents rotation of the second face seal element 24. The screwdriver 38 is now inserted between the face 72 of the retainer 26 and the flange 34 of the sleeve 32 so as to cause the flange 34 to be deflected in a manner which facilitates the gripping thereof so that the sleeve 32 can be axially removed from the shaft housing environment as partially shown in FIG. 4.

It can be seen that the present invention as described above meets the objectives of providing a face seal assembly which is maintained in an assembled relationship until finally positioned within a shaft housing environment. Such face seal assembly as specifically described is merely illustrative of the preferred form of practicing the present invention, it is not intended to limit the scope of the present invention.

We claim:

1. A face seal assembly for transporting face seal elements while maintaining said face seal elements in a mutually abutting relationship, said face seal elements including a first element having a first sealing face and a second seal element having a second sealing face adapted to abut said first element sealing face to form a rotating seal interface, said face seal assembly characterized by:

a sleeve having said first and second elements axially positioned thereon with said sealing faces in abutting contact and with each of said elements frictionally engaging the outer surface of said sleeve in a manner which prevents relative axial movement of said elements and whereby said face seal assembly is adapted to be positioned within a housing in a final assembly position concentric with respect to a shaft with said first and second element sealing faces in an axially abutting relationship on said sleeve.

2. The face seal assembly of claim 1 including a face seal retainer, said retainer adapted to be secured against rotation and cooperating with said second element to limit movement thereof, said face assembly including said first element, said second element and said retainer all positioned on said sleeve with said second element axially positioned between and cooperating with said first element and said retainer.

3. The face seal assembly of claim 2 wherein said sleeve includes a radially outwardly extending flange, said retainer having an outer end opposite the end cooperating with said second element, said retainer outer end comprising a radially extending face which abuts said sleeve flange when said retainer and said elements are axially positioned on said sleeve.

4. The face seal assembly of claim 3 wherein at least said sleeve flange is formed of deformable material, said sleeve flange and said retainer adapted to receive a tool therebetween to deform said flange to facilitate gripping of said flange in a manner to aid in removal of said sleeve from said assembly.

5. The face seal element of claim 2 wherein said second seal element and said retainer have restraining means preventing rotational movement therebetween but permitting limited axial movement therebetween.

6. The face seal assembly of claim 4 wherein said sleeve and flange are a unitary piece molded of ABS plastic and wherein the sleeve has a thickness T approximately equal to 0.025 inch.

7. A face seal assembly for the transporting and positioning within a shaft housing environment of face seal elements while maintaining said face seal elements in a mutually abutting relationship, said shaft housing environment comprising a stationary housing having an opening extending to one end of said housing, a shaft mounted for rotation within said housing opening and extending toward said one end of said housing, said face seal elements including a first element adapted to rotate with said shaft and a second element adapted to be secured against rotation relative to said housing, said first element having a sealing face, said second seal element having a sealing face seal surface adapted to abut said first element sealing face to form a rotating seal interface, a face seal retainer adapted to be secured to said stationary housing and cooperating with said second element to limit movement thereof, said face seal assembly characterized by:

a sleeve having said first element, said second element and said retainer all positioned thereon with said second element axially positioned between and cooperating with said first element and said retainer and with said sealing faces in abutting contact, said first and second elements frictionally engaging the outer surface of said sleeve in a manner which prevents relative axial movement of said elements, and whereby said face seal assembly is adapted to be positioned within said housing in a final assembly position concentric with respect to said shaft with said first and second element sealing faces in an axially abutting relationship on said sleeve and with a portion of said first element cooperating with said shaft for rotation therewith.

8. The face seal assembly of claim 7 wherein said second element and said retainer have biasing means cooperating to axially bias said second element away from said retainer and toward said first element when said face seal assembly is in said final assembly position to increase the axial forces causing said first and second element sealing faces to abut.

9. The face seal assembly of claim 8 including bearing means supporting said shaft for rotation within said housing, said bearing means cooperating with said first element to limit axial movement thereof away from said second element, said biasing means comprising a radially extending flange on said second element and a plurality of axially extending coil springs mounted on said retainer and engaging said second element flange to axially bias said second element toward said first element.

10. The face seal assembly of claim 7 wherein said first element has an inner end adapted to cooperate with said shaft in a manner which imparts the rotation of said shaft to said first element, said first element inner end being positioned axially from said sleeve when said first and second elements are frictionally retained on said sleeve and adapted to cooperate with a portion of said shaft not surrounded by said sleeve when said face seal assembly is in said final assembly position.

11. A face seal assembly for the transporting and positioning within a shaft housing environment of face seal elements while maintaining said face seal elements in a mutually abutting relationship, said shaft housing environment comprising a stationary housing having an opening extending to one end of said housing, a shaft mounted for rotation within said housing opening and extending toward said one end of said housing, said face seal elements including a first element adapted to rotate with said shaft and a second element adapted to be secured against rotation relative to said housing, said first element having a radially extending first sealing face, said second seal element having a second radially extending second sealing face adapted to abut said first face to form a rotating seal interface, said first seal element having at least a portion thereof having a minimal internal diameter $D_1$, and wherein said shaft has at least a portion thereof with a diameter $D_2$ which is less than diameter $D_1$, said face seal assembly characterized by:

a sleeve having a maximum thickness T wherein $2T$ is less than $D_1$ minus $D_2$ and having an outer surface, said face seal assembly consisting of said first and second elements axially positioned upon said sleeve with said sealing faces in abutting contact and with said elements frictionally engaging the outer surface of said sleeve in a manner which prevents relative axial movement of said seal elements, and whereby said face seal assembly is adapted to be positioned within said housing in a final assembly position concentric with respect to said shaft with said first and second seal faces in an axially abutting relationship on said sleeve and with a portion of said first element cooperating with said shaft for rotation therewith.

12. The face seal assembly of claim 11 wherein said first element includes a cylindrical step having an internal diameter greater than $D_1$, and said shaft portion cooperating with said first element inner end has an external diameter greater than $D_1$.

13. A face seal assembly for the transport and positioning within a shaft housing environment of face seal elements while maintaining said face seal elements in an abutting relationship, said shaft housing environment comprising a stationary housing having an opening extending to one end of said housing, a shaft adapted for rotation within said housing opening and extending toward said one end of said housing, bearing means supporting said shaft for rotation within said housing, said face seal elements including a first seal element adapted to rotate with said shaft and a second seal element adapted to be secured against rotation relative to said housing, said first seal element having a radially extending first annular face seal surface, said second seal element having a second radially extending second annular face seal surface adapted to abut said first face seal surface to form a rotating face seal interface, both said first seal element and said second seal element having at least a portion thereof having a minimal internal diameter $D_1$, a face seal retainer having a minimum internal diameter equal to or greater than diameter $D_1$, said retainer in part adapted to be secured to said stationary housing and in part cooperating with said second seal element to limit movement thereof, and wherein said shaft has at least a portion thereof with a diameter $D_2$ which is less than diameter $D_1$, said face seal assembly characterized by:

a cylindrical sleeve having a thickness T wherein 2T is less than $D_1$ minus $D_2$ and having an outer cylindrical surface having a diameter equal to or slightly greater than the diameter $D_1$, said sleeve further including a radial outwardly extending flange, said face seal assembly consisting of said retainer and said first and second face seal elements axially positioned upon said sleeve with said second seal element axially positioned between said first seal element and said retainer and with said face seal surfaces in abutting contact and wherein the internal diameter $D_1$ of each of said face seal elements frictionally engage the outer surface of said sleeve in a manner which prevents relative axial movement of said face seal elements to maintain said face seal surfaces in abutting contact, said retainer having a radially extending face opposite the end cooperating with said second seal element, said retainer face abutting said sleeve flange when said retainer and said seal elements are axially positioned on said sleeve, said second seal element and said retainer have biasing means cooperating to axially bias said second seal element away from said retainer toward said first seal element and having restraining means preventing rotational movement therebetween but permitting limited axial movement therebetween, said face seal assembly being adapted to be positioned within said housing in a final assembly position concentric with respect to said shaft with a portion of said first face seal element cooperating with a portion of said shaft not surrounded by said sleeve for rotation therewith and with said bearing means cooperating with said first seal element to prevent axial movement thereof, and wherein said retainer may be biased to a position increasing the axial bias on said second seal element toward said first seal element prior to securing said retainer to said housing and removal of said sleeve.

14. The face seal assembly of claim 13 wherein said first seal element has an inner end including a cylindrical step having an internal diameter greater than $D_1$ adapted to cooperate with a portion of said shaft having an external diameter greater than $D_1$ in a manner which imparts the rotation of said shaft to said first seal element, said first seal element inner end being positioned axially from said sleeve when said first and second seal elements are frictionally retained on said sleeve.

15. The face seal assembly of claim 14 wherein said sleeve and flange are a unitary piece molded of ABS plastic and wherein T approximately equals 0.025 inch and said sleeve flange is formed of deformable material, said sleeve flange and said retainer being adapted to receive a tool therebetween to deform said flange to facilitate gripping of said flange in a manner to aid in removal of said sleeve from said shaft housing environment.

16. A method of maintaining a face seal assembly in abutting relationship and positioning said assembly within a housing having a shaft rotatably supported therein, wherein said face seal assembly includes a first seal element adapted to engage said shaft and rotating therewith, a second seal element adapted to be stationarily secured within said housing, said first and second seal elements having first and second faces respectively which are adapted to abut each other and form a rotating seal interface, the method characterized by:

forming a face seal assembly by positioning said first and second seal elements on a sleeve with said first and second faces mutually abutting and with said first and second seal elements frictionally engaging the outer surface of said sleeve to maintain said first and second faces in abutting relationship, concentrically positioning said face seal assembly around said shaft in a manner wherein a portion of said first seal element cooperates with said shaft in a manner to impart the rotation of said shaft to said first seal element, securing said second seal element to said housing in a manner which prevents rotational movement of said second seal element relative to said housing, and then axially removing said sleeve from between said shaft and said first and second seal elements.

17. The method of claim 16 wherein said face seal assembly further includes a retainer which in part is adapted to secure said second seal element against rotation and limit axial movement of said second seal element relative to said housing, the method further characterized by:

positioning said retainer element on said sleeve with said first and second seal elements prior to positioning said seal assembly around said shaft.

18. The method of claim 16 wherein said seal assembly further includes biasing means cooperating with said second seal element and said retainer element in a manner which is adapted to axially bias said second seal element away from said retainer element and into contact with said first seal element, the method further characterized by:

axially positioning said retainer in a manner which increases the axial bias on said second seal element to increase the axial forces causing said first and second seal element faces to abut, and then securing said retainer to said housing prior to removal of said sleeve.

19. The method of claim 17 wherein said sleeve includes a radially, outwardly extending circular flange, and wherein each of said seal elements and said retainer has an outer end and an inner end, and the method step of forming said face seal assembly is further characterized by:

forming said seal assembly by axially positioning said retainer and said seal elements on said sleeve in the following sequential order:

a. said retainer with its outer end abutting said sleeve flange, b. said second seal element with its outer end in cooperating relationship with the inner end of said retainer, c. said first seal element with its outer end comprising said first face in abutting relationship with the inner end of said second seal element comprising said second face and wherein the inner end of said first seal element axially extends beyond a free end of said sleeve axially spaced from said flange, the inner end of said first seal element being adapted to cooperate with a portion of said shaft at an axial position clear of said sleeve when said sleeve is positioned on said shaft.

20. The method of claim 19 wherein said sleeve and flange are formed of deformable plastic and the method step of removing said sleeve is characterized by inserting a tool between said flange and said retainer to deform said flange in a manner which facilitates gripping of said sleeve flange to aid in removal of said sleeve from said seal assembly.

* * * * *